(12) United States Patent
Mileo et al.

(10) Patent No.: US 8,933,178 B2
(45) Date of Patent: Jan. 13, 2015

(54) GAS-PHASE POLYMERIZATION REACTOR CONTROL

(75) Inventors: Antonio Mileo, Mercato San Severino (IT); Giorgio Ballarini, Ferrara (IT); Luca Soffritti, Pontelagoscuro (IT); Enrico Soffritti, legal representative, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 835 days.

(21) Appl. No.: 13/142,356

(22) PCT Filed: Dec. 23, 2009

(86) PCT No.: PCT/EP2009/067875
§ 371 (c)(1),
(2), (4) Date: Jul. 19, 2011

(87) PCT Pub. No.: WO2010/076284
PCT Pub. Date: Jul. 8, 2010

(65) Prior Publication Data
US 2011/0269921 A1    Nov. 3, 2011

Related U.S. Application Data

(60) Provisional application No. 61/204,703, filed on Jan. 9, 2009.

(30) Foreign Application Priority Data

Dec. 29, 2008    (EP) .................................... 08172965

(51) Int. Cl.
*C08F 2/34*    (2006.01)
*C08F 2/00*    (2006.01)
*G05B 13/04*    (2006.01)
*B01J 8/18*    (2006.01)
*G01L 27/00*    (2006.01)
*C08F 210/16*    (2006.01)

(52) U.S. Cl.
CPC ............. *G05B 13/048* (2013.01); *B01J 8/1809* (2013.01); *C80F 10/00* (2013.01); *B01J 2208/0007* (2013.01); *B01J 2208/00548* (2013.01); *B01J 2219/002* (2013.01); *B01J 2219/00202* (2013.01); *B01J 2219/0022* (2013.01); *B01J 2219/00236* (2013.01); *C08F 210/16* (2013.01); *C08F 2400/02* (2013.01)
USPC ................................. 526/61; 526/59; 700/269

(58) Field of Classification Search
USPC .......................... 526/59, 61; 700/269; 702/98
See application file for complete search history.

(56) References Cited

U.S. PATENT DOCUMENTS 2,964,511 A    12/1960    Cottle
6,144,897 A    11/2000    De Silliers
(Continued)

FOREIGN PATENT DOCUMENTS

SU        1281566        1/1987
WO    WO-96/41822    12/1996
WO    WO-00/22489    4/2000

*Primary Examiner* — Fred M Teskin

(57) ABSTRACT

A control method for controlling a fluidized bed polymerization reactor in the production of a given polymer product, the method comprising the following steps:
(a) determining a ratio of the production rate of the polymer product in the reactor to the pressure in the reactor,
(b) setting a production rate of the polymer product in the reactor which production rate, on the basis of said ratio of step (a), corresponds to a desired pressure in the reactor;
(c) adjusting the feed rates of monomers into the reactor in accordance with said set point production rate.

5 Claims, 1 Drawing Sheet

(56) References Cited

U.S. PATENT DOCUMENTS

| | | |
|---|---|---|
| 6,263,355 B1 | 7/2001 | Harrell |
| 6,521,805 B2 | 2/2003 | Arrivat et al. |
| 2002/0026024 A1 | 2/2002 | Heritier |
| 2008/0119621 A1* | 5/2008 | Samples et al. ......... 526/59 |

* cited by examiner

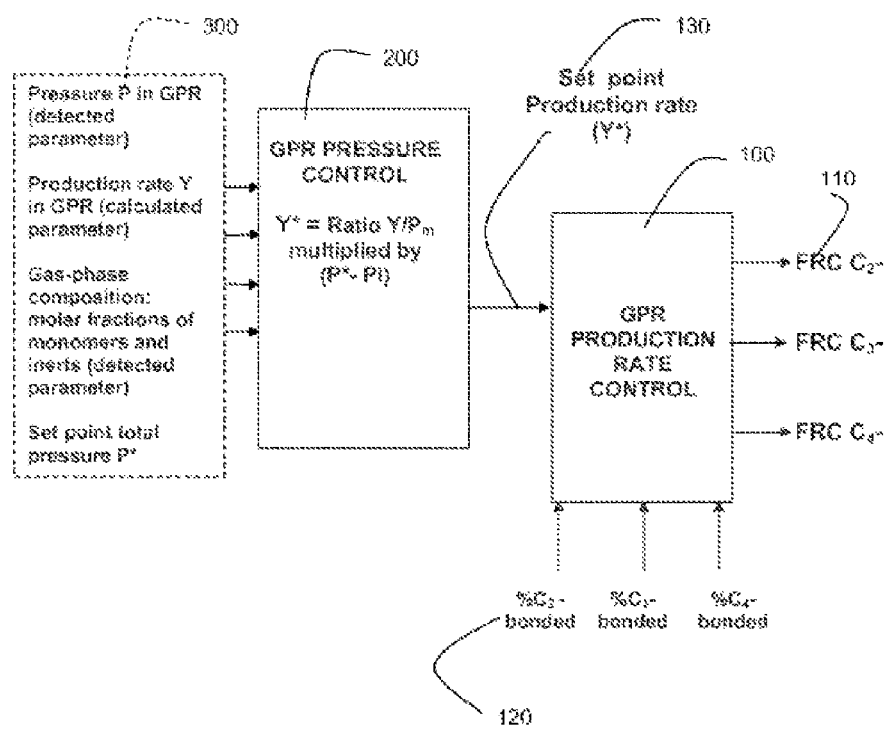

GAS-PHASE POLYMERIZATION REACTOR CONTROL

This application is the U.S. national phase of International Application PCT/EP2009/067875, filed Dec. 23, 2009, claiming priority to European Patent Application 08172965.9 filed Dec. 29, 2008, and the benefit under 35 U.S.C. 119(e) of U.S. Provisional Application No. 61/204,703, filed Jan. 9, 2009; the disclosures of International Application PCT/EP2009/067875, European Patent Application 08172965.9 and U.S. Provisional Application No. 61/204,703, each as filed, are incorporated herein by reference.

BACKGROUND

The present invention relates to a method for controlling a fluidized bed gas phase polymerisation reactor in the production of a polymer.

In particular, the method of the invention combines control of reactor production rate, based on feed flow rate(s) of the monomers, with pressure control inside the fluidised bed reactor.

In the prior art WO 00/22489 relates to a system for the on line control of a plant of polypropylene and its copolymers produced in loop reactors and, optionally, gas-phase reactor(s) with the aid of mathematical models, wherein said system is based on a control matrix comprising controlled variables, constrained controlled variables, manipulated variables, and disturbance variables. It is suggested that such a control system could enable the maximization of production rate and catalyst yield of the producing process. It is noted that a relevant point regarding process control is the fact that, generally, economic aspects require the process to be operated close to plant capacity limits. However, it is also noted that although catalyst flow rate could be manipulated to control the production rate of a reactor, when polymerization heat exceeds the limit of the thermal exchange capacity of the reactor, the objective of increasing production even more should be restricted in favour of thermal stability.

WO 00/22489 mentions that a variable to be controlled may be the pressure of gas phase reactors and indicates that the mathematical model for control of the pressure of gas phase reactors may use the following as input variables: the flow rate of catalyst fed to the reactor(s); the density of reaction medium of the loop reactor(s); the flow rate co-monomer(s) fed to the gas phase reactor; the gas-phase reactor bed level; the flow rate of gas returning from a separation tower.

In the prior art various other proposals have been made for the control of polymerisation reactions.

For example, SU 1281566 discloses that the gas-phase polymerization or copolymerization of α-olefins in the presence of a catalyst, H, and CO2 is controlled by regulating the reactor pressure and by changing the monomer feed rate, and the melt flow index at different loads is controlled by changing the concentration of CO2 and H. The reactor productivity is increased by regulating the particle size of the resulting polymer by a direct proportional change in the concentration of CO2, taking into account the activity of the catalyst.

U.S. Pat. No. 2,964,511 proposes that, in a liquid phase catalytic polymerisation reaction (i.e. polymerisation of ethylene) in a pressurized reaction zone carrying a liquid phase and a vapour phase and to which polymerisation catalyst and monomer are fed continuously in separate streams, control of the reaction comprises sensing the pressure in said reaction zone and regulating the flow of monomer feed to the reactor in compensation for changes of pressure within vapour phase of the reaction zone. Further, a control signal may be produced as a function of the pressure, and the control signal applied to increase the rate at which catalyst is fed to said reaction zone in response to a pressure increase and to decrease the rate at which said catalyst is fed to said reaction zone in response to a pressure decrease, thereby maintaining said pressure within predetermined limits.

U.S. Pat. No. 6,521,805 relates to an isobutene polymerisation process wherein a property P (viscosity or average molecular weight) of the polyisobutene produced is maintained constant. The polymerisation is conducted continuously in a reactor comprising a boiling liquid reaction phase in equilibrium with a gas phase, by continuous introduction into the reactor of a catalyst and of a C4 hydrocarbon feed mixture comprising the monomer, and by continuous withdrawal from the reactor of the liquid reaction phase. The process comprises the determination of a target value V of the partial pressure, PiC4, of the isobutene in the reactor gas phase corresponding to the desired value of the property P, by virtue of an empirical relationship established beforehand between the property P of the polyisobutene produced and PiC4. During the polymerisation, PiC4 is measured and a corrected value of PiC4, (PiC4)c, is calculated and is held constant at around the target value V, by acting on the flow rate Qc of the catalyst and/or on the flow rate Qh of the C4 hydrocarbon feed mixture.

U.S. Pat. No. 6,263,355 relates to a method for controlling a chemical reactor such as a gas-phase reactor using a non-linear predictive control which includes steps for generating a plurality of signals representing a current state of the chemical reactor and reflecting a respective constituent of reactants in the chemical reactor, calculating a future state of the chemical reactor responsive to said plurality of signals and referenced to mass hold-up of the reactants in the chemical reactor, and controlling at least one parameter related to the chemical reactor so as to control the future state of the chemical reactor. It is suggested that a process control method which prioritises set points, e.g. pressure set point, is to be provided.

WO 96/41822 suggests a method for controlling a process for synthesising at least one chemical in a plant including at least one reactor (R) that may be considered as a perfectly mixed reactor, wherein control variables enable the process to be controlled so that a number of variables known as controlled variables and related to the properties of the product and/or the operation of the process match corresponding set values. The method comprises the steps of (a) inputting set values for the controlled variables; (b) using a prediction unit to calculate predictions of the controlled variables on the basis of measurements of the process control variables; (c) using a control unit to calculate set values for the process control variables on the basis of the set values and predictions of the controlled variables; and (d) transmitting set values for the process control variables to process control actuators. For each process control variable, e.g. temperature, flow rate or pressure, to be controlled its actual value may be measured continuously or intermittently and a PID controller used to compare this actual value with a set value.

It will be understood from the above examples from the prior art that a variety of proposals have been made relating to reactor pressure control, including partial pressure control, in polymerisation reactions.

The prior art (see the above-mentioned SU 1281566, U.S. Pat. No. 2,964,511, U.S. Pat. No. 6,521,805, U.S. Pat. No. 6,263,355, WO 96/41822) indicates that, alongside feed flow rate, catalyst flow rate could also be used for pressure control. The prior art (WO 00/22489) may also indicate that catalyst flow rate can be used for control of reactor production rate.

However, the prior art provides no indication as to how control of reactor production rate based on feed flow rate(s) could be combined with pressure control in a fluidized bed gas phase polymerisation reactor.

The inventors have had the insight that there can be provided a practical and simple method for control of a fluidized bed gas phase polymerization reactor in which control of reactor production rate based on feed flow rate(s) is combined with pressure control, without the production rate control competing with the pressure control, that is with the improvement that the production rate control and pressure control do not act separately on the regulation of the monomer feed rates to the GPR.

SUMMARY OF THE INVENTION

In accordance with the present invention there is provided a control method for controlling a fluidized bed polymerisation reactor in the production of a polymer, the method comprising the following steps:
(a) determining a ratio of the production rate of the polymer in the reactor to the pressure in the reactor,
(b) setting a production rate of the polymer in the reactor which production rate, on the basis of said ratio of step (a), corresponds to a desired pressure in the reactor;
(c) adjusting the feed rates of monomers into the reactor in accordance with said set point production rate.

Thus, the present invention effectively combines control of reactor production rate, based on feed flow rate(s), with pressure control.

It has been found that the present invention can serve to improve or maximise production in the gas phase reactor (GPR). It can serve to maintain pressure inside the gas phase reactor constant or almost constant at a desired value. Consequently the invention can help to manage the GPR and facilitate achievement of maximum GPR production (working the GPR on average at a higher pressure).

BRIEF SUMMARY OF THE DRAWING

Reference is made to the accompanying drawing, which is a schematic block diagram illustrating control of a gas phase polymerisation reactor controlled in accordance with an exemplary embodiment of the present invention.

DETAILED DESCRIPTION

According to the method of the exemplary embodiment the desired production rate (Y*) of the gas-phase reactor (GPR) is provided by means of a GPR Pressure Control 200, schematically illustrated in the drawing.

The input values to the GPR Pressure Control 200 are schematically illustrated at 300 in the drawing. The pressure (P) in the GPR is detected as an input value for the GPR Pressure Control 200.

The composition and molar fractions of monomers and inert components in the Gas-phase reactor are also detected as an input value for the GPR Pressure Control 200.

The production rate (Y) is not directly detected in this embodiment of the invention, but it is calculated by means of equations relative to a mass balance or an energy balance, as better explained below.

Starting from the above input values of production rate (Y), pressure (P) in the gas-phase reactor and molar compositions of the monomers in the gas-phase reactor, the GPR Pressure Control 200 of present invention automatically generates a set point (Y*=Y/P) for the reactor production rate.

The desired GPR polymer production rate 130 (Y*) represents an input value for a GPR Production Rate Control, schematically indicated with 100 in the drawing.

On the basis of said value Y* generated by the GPR pressure control 200, the GPR Production Rate Control 100 is able to adjust automatically the feed rates of fresh monomers (e.g. C2–, C3–, C4– as illustrated in the drawing) supplied to the gas-phase reactor. The GPR Production Rate Control 100 adjusts the feed rates of fresh monomers via the respective monomer feed rate controllers also taking into account the set points 120 for percentages of the monomers to be bonded in the produced polymer. For example, if the reacting monomers are ethylene and/or propylene and/or butene-1, the drawing shows the control of these monomers, 110, with the following meanings:

FRC $C_{2-}$=ethylene feed rate control;
FRC $C_{3-}$=propylene feed rate control;
FRC $C_{4-}$=butene-1 feed rate control;
% C2-bonded=the set point for ethylene percentage to be bonded in the polymer;
% C3-bonded=the set point for propylene percentage to be bonded in the polymer;
% C4-bonded=the set point for butene-1 percentage to be bonded in the polymer.

The control method of the invention comprises the following steps:

Step (a): this step comprises the determination of the ratio (Y/Pm) of production rate (Y) of the polymer in the reactor to the sum ($p_m$) of partial pressures of the monomers in the reactor. The sums $p_m$ of partial pressures of the monomers and the sum pi of the partial pressures of inert components in the GPR can be determined from the detected gas phase composition in the GPR (molar fractions of monomers and inert components).

The ratio (Y/Pm) is detected as a punctual value at pre-set intervals of time, which generally range from 30 seconds to 5 minutes, so that a new value of Y* is provided at this pre-set interval of time.

Step (b): this step comprises determining a set point production rate (Y*) by multiplying said ratio (Y/Pm) for the value (P*–Pi), wherein P* is the set point pressure in the reactor, Pi=sum of partial pressures of the inert components in the reactor.

The value $\{(Y/Pm) \times (P^*-Pi)\}$ may be calculated by the GPR Pressure Control 200 at the same pre-set intervals of time, at which the ratio (Y/Pm) is detected. In this way, a new value for the set point production rate (Y*) is automatically provided.

Step (c): this step is operated by means of a Production Rate Control, which starting from the set point production rate (Y*), is able to adjust automatically the feed rates of the monomers supplied to the gas-phase reactor.

As shown in the drawing, the set point production rate 130 (Y*) is input to the GPR Production Rate Control 100, which adjusts the feed rates of the monomers fed into the reactor in accordance with the value Y*, so as to establish the desired set point pressure inside the fluidised bed reactor.

By way of a simplified example, we can suppose that the GPR is operated in the absence of inert polymerization components (e.g. nitrogen, propane), so that the sum of the partial pressures Pm of the reacting monomers coincides with the total absolute pressure P in the reactor.

If the current production rate of the gas-phase reactor is Y=4 ton/h of polymer and the current reactor pressure is p=17 bar, then the GPR Pressure Control 200 of the drawing detects the ratio Y/p=0.235 ton/(h*bar) and then multiplies said ratio for the set point pressure P*. Supposing P*=18 bar, this means that the Pressure Control 200 will set the set point production rate Y* at (0.235.times.18)=4.23 ton/h.

On the basis of the said value Y* generated by the pressure control 200, the Production Rate Control 100 adjusts automatically the feed rates of olefin monomers (e.g. C2-, C3-, C4- as illustrated in the drawing) supplied to the gas-phase reactor. As said the GPR Production Rate Control 100 adjusts the feed rates of fresh olefin monomers, also taking into account the set points 120 of the percentages of the monomers to be bonded in the produced polymer.

In the exemplified case, in accordance with the value Y*=4.23 ton/h, the production Rate Control 300 will increase the monomer feed rates to the reactor up to increase the pressure inside the reactor close to the set point value of 18 bar.

When the appropriate pressure is re-established, the control method of the invention is reiterated as described above.

In the above example, for clarity, control is described as being exercised on the basis of total pressure in the reactor. This is appropriate when the sum of the partial pressures of inert components (e.g. propane) in the reactor can in substance be neglected in comparison with the sum of the partial pressures of the monomers in the reactor. This could arise, at least theoretically, but in practice non-negligible amounts of inert components (nitrogen, propane, etc.) can be present in a fluidised bed reactor in order to favour a partial removal of the polymerization heat (the polymerization reaction being exothermic).

The invention also relates to a computer program which, when run on a computer, provides for process control of a fluidized bed gas phase polymerization reactor in the production of a polymer in accordance with the above described method.

Another aspect of the invention provides a process controller for controlling a fluidized bed gas phase polymerisation reactor in the production of a polymer. In an exemplary embodiment the controller comprises:

(A) means for determining a ratio (Y/P; Y/Pm) of production rate (Y) of the polymer in the reactor to pressure (P; Pm) in the reactor, (B) means for setting a production rate (Y*) of the polymer in the reactor which production rate Y*, on the basis of the ratio of step (A), corresponds to a desired pressure (P*) in the reactor;

(C) means for adjusting the feed rates of monomers into the reactor in accordance with the set production rate (Y*) of the polymer in the reactor.

As can be understood from the drawing, the means (B) may be a GPR pressure control, which calculates a set point production rate (Y*) in the reactor by multiplying said ratio (Y/Pm) for the value (P*-Pi), wherein P* is the set point pressure in the reactor, Pi=sum of partial pressures of the inert components in the reactor.

The means (C) may be a production rate Control, which on the basis of said set point production rate (Y*), adjusts automatically the feed rates of the olefin monomers supplied to the gas-phase reactor.

A constraint may be applied if pressure in the GPR exceeds the set point pressure (P*) by more than a certain amount, for example 0.5 bar. In this case the production rate is quickly reduced in order to reduce pressure in the GPR. Further, control as described above should not be active during plant start up, since strong changes in polymer level could affect for some time the calculations involved in the control.

To maximise production of a given polymer in the GPR both polymer level and pressure in the GPR should be kept at a maximum possible. The polymer level in the GPR may be regulated for example by a PID (Proportional-Integral-Differential) controller acting on polymer discharge valves of the GPR. The pressure is regulated by the control of the present invention acting on the production rate set point of the GPR production control, which in turn acts on the fresh monomer feed rates.

A GPR pressure control in accordance with the embodiment of the drawing has been implemented by the Applicant in a polymerization plant comprising a fluidized bed Reactor: the GPR pressure control provided very satisfying results with the effective value (bar) of pressure P in the reactor closely following the GPR pressure set point value P*. It had been found that the control method of the invention is able to keep pressure inside reactor close to the desired set point.

The invention claimed is:

1. A control method for controlling a fluidized bed polymerisation reactor in the production of a polymer, the method comprising the following steps:
(a) determining a ratio, (Y/Pm), of the production rate of the polymer in the reactor, (Y), to the pressure in the reactor, (Pm);
(b) setting a production rate of the polymer in the reactor which production rate, on the basis of said ratio of step (a), corresponds to a desired pressure in the reactor; and
(c) adjusting the feed rates of monomers into the reactor in accordance with said set point production rate.

2. The method according to claim 1, wherein the pressure in the reactor, (Pm), is the sum of partial pressures of the monomers in the reactor and the ratio (Y/Pm) is detected as a punctual value at a pre-set interval of time.

3. The method according to claim 2, wherein said pre-set interval of time ranges from 30 seconds to 5 minutes.

4. The method according to claim 1, wherein step b) determines a set point production rate (Y*) in the reactor by multiplying said ratio (Y/Pm) a value (P*-Pi), wherein P* is the set point pressure in the reactor, and Pi is the sum of partial pressures of the inert components in the reactor.

5. The method according to claim 4, wherein step c) is operated by means of a Production Rate Control, which starting from said set point production rate (Y*), adjusts automatically the feed rates of the monomers supplied to the gas-phase reactor.

\* \* \* \* \*